(12) United States Patent
Tunze (10) Patent No.: US 7,743,734 B2
(45) Date of Patent: Jun. 29, 2010

(54) METHOD AND DEVICE FOR GENERATING WAVES IN AN AQUARIUM

(75) Inventor: Axel Tunze, Penzberg (DE)

(73) Assignee: Tunze Aquarientechnik GmbH, Penzberg (DE)

( * ) Notice: Subject to any disclaimer, the term of this patent is extended or adjusted under 35 U.S.C. 154(b) by 817 days.

(21) Appl. No.: 11/125,652

(22) Filed: May 10, 2005

(65) Prior Publication Data

US 2005/0263090 A1 Dec. 1, 2005

(30) Foreign Application Priority Data

May 11, 2004 (DE) .................... 10 2004 023 708

(51) Int. Cl.
*A01K 63/00* (2006.01)

(52) U.S. Cl. .............................. 119/247; 405/79; 4/491

(58) Field of Classification Search ................ 119/245, 119/232, 246, 247, 248, 251, 259, 260, 261, 119/263, 255, 256, 257; 405/79; 4/491
See application file for complete search history.

(56) References Cited

U.S. PATENT DOCUMENTS

| | | | | |
|---|---|---|---|---|
| 2,002,043 A * | 5/1935 | Price | ............................... | 4/491 |
| 3,350,724 A * | 11/1967 | Leigh | ............................... | 4/491 |
| 4,201,496 A * | 5/1980 | Andersen | ...................... | 405/79 |
| 4,290,153 A * | 9/1981 | Kockerols et al. | ............... | 4/491 |
| 4,507,018 A * | 3/1985 | Andersen | ...................... | 405/79 |
| 4,558,474 A * | 12/1985 | Bastenhof | ....................... | 4/491 |
| 4,705,428 A * | 11/1987 | Andersen | ...................... | 405/79 |
| 4,810,129 A * | 3/1989 | Guevel et al. | .................. | 405/79 |
| 5,337,698 A * | 8/1994 | Widmyer | .................. | 119/51.04 |
| 5,535,702 A * | 7/1996 | Idbeis | ......................... | 119/247 |
| 5,621,925 A * | 4/1997 | Bastenhof | ....................... | 4/491 |
| 5,799,612 A * | 9/1998 | Page | ........................... | 119/260 |
| 6,062,166 A * | 5/2000 | Macrina | ................... | 119/51.11 |
| 6,217,256 B1 * | 4/2001 | Inan | ............................ | 405/79 |
| 6,729,799 B1 * | 5/2004 | Raike | ........................... | 405/79 |

OTHER PUBLICATIONS

Definitions of terms "pump" and "valve" from Dictionary.com.*

* cited by examiner

*Primary Examiner*—T. Nguyen
(74) *Attorney, Agent, or Firm*—Young Basile (57) ABSTRACT

In order to generate waves in a volume of water (12) of an aquarium, it is proposed that a storage container (22) which extends beyond the surface of the volume of water (12) should be provided in the aquarium (10). Using a pump (32), water is periodically pumped from the water container (10) into the storage container (22) and returned from the storage container (23) into the aquarium (10). The energy delivered to the water during this leads to fluctuations in the position of the free surface (14) of the volume of water (12) and in-phase operation of the pump (32) provides stronger surface displacements in the aquarium (10), which are comparable with a wave in open water and which expose the plants and living beings in the aquarium to an alternating mechanical load.

18 Claims, 9 Drawing Sheets

METHOD AND DEVICE FOR GENERATING WAVES IN AN AQUARIUM

BACKGROUND OF THE INVENTION

The invention relates to a method for generating waves in an aquarium and to a device therefor.

The water in aquaria is normally circulated constantly through a filter for cleaning purposes by using a pump. Although this does lead to flows of water, they are negligibly small.

It is furthermore known to set up a stronger flow in such aquaria by making pumps extract water directly from the volume of water contained in the aquarium and return it directly into this volume of water.

For many applications, it is actually preferable to be able to replicate waves in an aquarium. Waves are distinguished in that volumes of water move to and fro periodically. These oscillating movements of the water lead to corresponding alternating loads on plants and animals contained in the water.

SUMMARY OF THE INVENTION

In order to make these alternating loads available in an aquarium as well, the present invention relates to a method and to a device for generating waves in the restricted space of an aquarium.

The invention makes use of the fact that water is a liquid which has relatively low internal friction. The energy needed in order to generate a wave process can therefore be introduced as small portions into the volume of water, and the intended amplitude of the wave can be achieved by means of the total time duration of the energy input. This makes it possible to deliver the kinetic and/or potential energy by using structures which have compact dimensions. This is preferable with a view to the aquaria installed in living rooms, since extra equipment is perceived as aesthetically unpleasing there.

Preferred refinements of the invention are given in the dependent claims.

One refinement of the invention is preferable with a view to setting up waves as rapidly as possible with little energy input. The frequency at which the water level fluctuates in the aquarium in question is measured, and the energy delivery can then be synchronised accordingly.

One refinement is preferable with a view to generating stronger waves.

One method ensures that waves are not built up too strongly, and in particular that water does not escape from the aquarium.

One refinement of the invention is also preferable with a view to minimal input of energy.

In the device, volumes of liquid are displaced while delivering potential optionally as well as kinetic energy, by raising a subvolume of the water in the storage container to a level which is higher than the free level of the water in the aquarium. This volume can then be returned into the aquarium under the effect of gravity, with kinetic energy optionally also being imparted to it by the delivery instrument.

As an alternative, a volume of water lying below the free level of the water in the aquarium may be pumped and allowed to flow back after switching off the delivery instrument.

The delivery instrument may thus operate only intermittently and allow water to flow back in the periods of time between the working cycles. The delivery instrument may also have a reversible direction of rotation, however, and expel water from the storage container and deliver it into the storage container in successive half-cycles. With this procedure, the kinetic energy necessary in order to set up stronger waves is delivered to the water in a shorter time.

In both cases, it is favourable for the delivery instrument to have only a small flow resistance.

A pump having a propeller which as a delivery element is distinguished by a high throughput with a low pressure build-up. Such a pump can also be used equally well in both working directions.

The refined invention wherein the propeller which is enclosed by a pump housing provided with through-openings in the circumferential wall and has an axial delivery piece is preferable with a view to delivered water flows which are as laminar as possible.

The refinement of the invention wherein the through-openings are designed as axial slots which are distributed in the circumferential direction and distributed equally is also used to avoid turbulence.

Another refinement of the invention has the advantage that the interior of the storage container is substantially isolated from the volume of water in the aquarium.

Another refinement of the invention makes it possible to arrange the storage container, and the delivery instrument belonging to it, close to the normal surface of the aquarium so that a large part of the volume of water remains unperturbed.

A device wherein a level monitor is arranged at the upper end of the storage container ensures that more water can be moved into the storage container that is expedient in order to introduce potential energy.

The device can be constructed so that the delivery instrument is immersed only very little into the volume of water in the aquarium, where it is visible.

The refinement of the invention ensures very effective transfer of motion energy to the water contained in the aquarium.

If the waves are generated by a device comprising a tilting bearing provided for the aquarium and a drive engaged on the aquarium, then virtually all the interior of the aquarium can remain free of equipment. A device as indicated in claim 18 can also be retrofitted to aquaria which are already being used.

A tilting bearing can be implemented without mechanical work on the aquarium.

A tipping drive is distinguished by very compact dimensions in the vertical direction. This drive can therefore be arranged at the bottom of the aquarium.

The two cooperating discs of the drive then form a compact unit with smooth faces.

The effect achieved by one of the refinements of the invention is that, on the one hand, a friction lock is obtained between the working part of the tipping mechanism and the aquarium and, on the other hand, the drive connection between the tipping drive and the aquarium permits smaller tilting between the drive and the aquarium.

A tipping drive having a pressure actuator which is selectively pressurized or relieved of pressure is distinguished by a particularly straightforward and robust mechanical structure, and low production costs.

The refinement wherein the pressure actuator is a deformable monobloc element is then preferable with a view to a further simplified structure and good reliability of the drive, with low costs.

The pressure actuator being enclosed by two telescopic parts ensures that the drive then has an attractive exterior and is protected against transverse loads.

Another refinement of the invention makes it possible to vary the intensity and shape of the waves generated in the aquarium in a straightforward way.

A controller is then distinguished by a straightforward structure. The delivery instrument or tilting drive is operated by a clock generator, the frequency of which is preferably adjustable, with a frequency at which the intended wave amplitude is obtained according to observation of the resulting waves.

In a device wherein the control end interacts with at least one level detector the program control can actually establish the oscillating frequency of the wave in the aquarium from the output signal of the level detector connected to it, and can tune it according to its operation.

Another refinement of the invention allows straightforward adaptation of the position of the level detector to the water level conditions respectively encountered in the aquarium.

Waves generated in the aquarium would also move to and fro the food which is added to the aquarium at predetermined time intervals, and make it settle on plants, stones etc. in the container. One effect achieved by a refinement of the invention is that the wave generation can be suspended for a predetermined length of time. This avoids the aforementioned loss of food.

For much aquarium stock, it is also preferable not to generate waves during the night.

One refinement of the invention makes it possible to adapt the wave generator in a very straightforward way to the respective filling level of the aquarium. The wave generator should be arranged so that the one hand it can take in as much water as possible from the interior of the aquarium and, on the other hand, it is always immersed in the volume of water even with the strongest waves which are generated in the aquarium.

The effect achieved by one refinement of the invention is that an inlet, and outlet, a dirt extractor or the like essentially operate equally when there are waves and when the water is still.

Strong waves can be generated even in large aquaria.

The refinement of the invention wherein one of two wave generators operates at different frequencies can then influence the waveform. On the one hand, particularly abrupt wave profiles can be generated by superposition of the long-wave and short-wave components; on the other hand (with an appropriate amplitude and phase relation) it is also possible to set up short-wave flows of smaller amplitude.

Essentially periodic waves are then also obtained by a device wherein one of the two wave generators operates at twice the frequency of the other wave generator.

The refinements of the invention wherein the two wave generators lie close together and their flow axes are aligned parallel or are arranged on opposite walls with their flow axes pointing towards each other are preferable with a view to generating large amplitudes by wave units which reinforce one another.

Another refinement of the invention allows fine control over the amplitude of the waves being generated.

BRIEF DESCRIPTION OF THE DRAWINGS

The invention will be explained in more detail by exemplary embodiments with reference to the drawings, in which.

DETAILED DESCRIPTION OF THE PREFERRED EMBODIMENT

Figure 1:
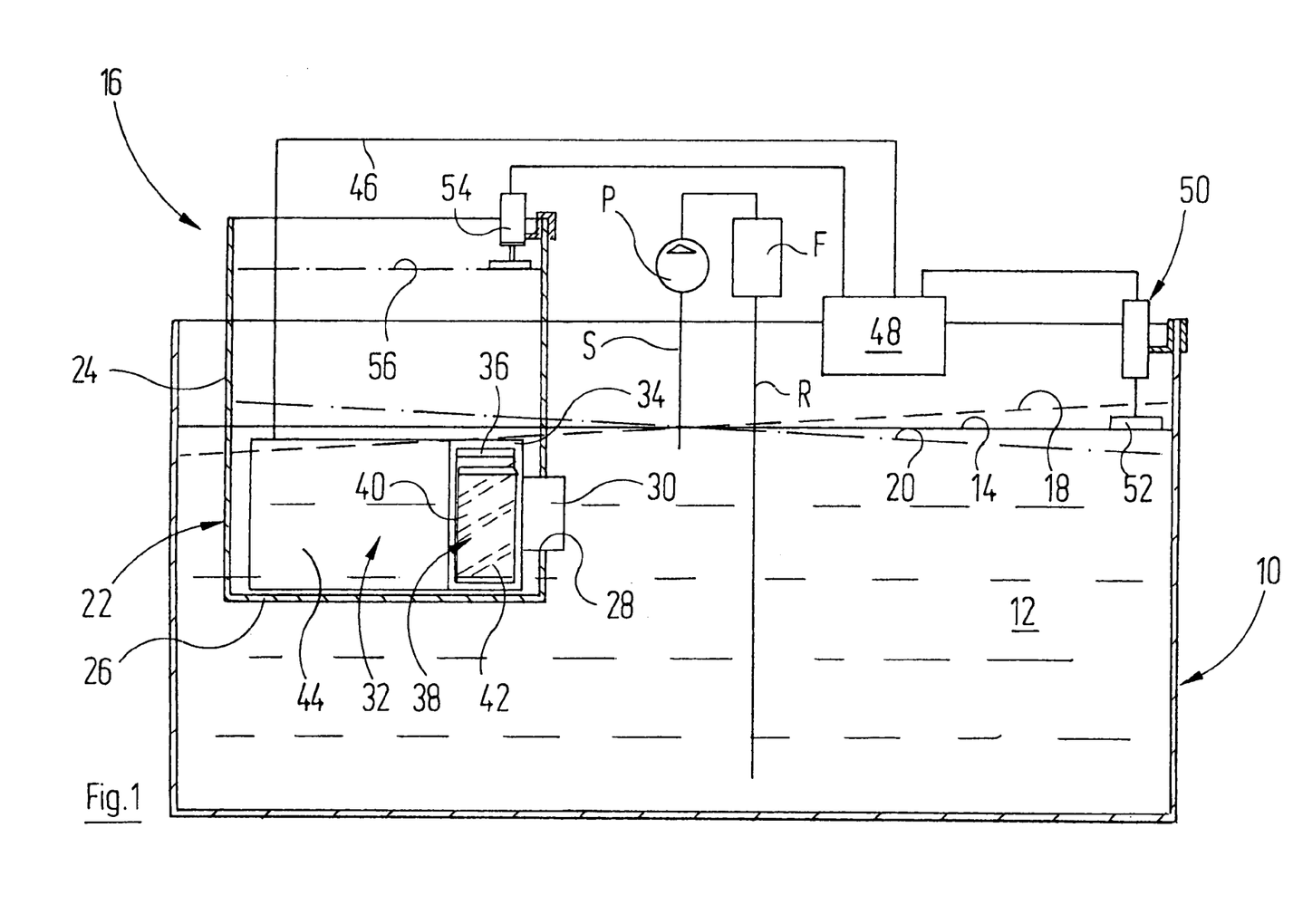
FIG. 1 shows a vertical section through an aquarium having a wave generator.

In FIG. 1, the reference 10 denotes an aquarium in which there is a volume of water 12. Its free surface 14 is aligned horizontally in the absence of any extraneous effects.

In order to set up conditions in the volume of water similar to those encountered when there are waves in open water, a wave generator denoted overall by 16 is arranged in the aquarium 10 and periodically moves the surface 14 of the volume of water 12 to and fro in oscillation during operation, between two extreme positions which are indicated at 18 and 20 in the drawing, respectively by dashes and by dots and dashes.

The wave generators are generally arranged on a narrow side of the aquarium. There, they may also be placed in a corner where they do not impede the view. The wave generators may, however, also be arranged in an end section of the aquarium which is covered on the outside by a shade.

It can be seen that there is a region in the middle of the aquarium where the water level changes little or not at all. In this region, a suction tube S via which a pump P takes in water near the surface dips into the upper layer of the volume of water. This water is sent by the pump P through a filter F and is fed back via a return line R into a lower region of the volume of water in the aquarium 10.

The wave generator 16 comprises a storage container 22, which has a cylindrical circumferential wall 24 and a bottom wall 26. A window 28, into which a delivery piece 30 of a delivery pump 32 is fitted essentially hermetically, is formed in the lower section of the circumferential wall 24. The delivery piece 30 is carried by the end face of a pump housing 34, which has a multiplicity of slotted through-openings 36 distributed equally in the circumferential direction in its circumferential wall.

Inside the pump housing 34, there is a rotor denoted overall by 38 which has a hub 40 and propeller blades 42, distributed equally in the circumferential direction, which are carried by the latter. The hub 40 is linked in rotation with the shaft of a variable-direction electric motor 44.

The electric motor 44 is supplied with energy, and has its direction of rotation controlled, by a control unit 48 via a line 46.

As another input signal, the control unit 48 receives the actual position of the surface 14, as measured at a point near the edge. To this end, a level sensor 50 which has a float 52 interacting with the surface 14 is provided.

Another signal which the control unit 48 receives is the output signal of a level switch 54, which is fitted in the storage container 22 and responds when the level inside the water, container has reached a predetermined level 56.

Generally speaking, the control unit 48 operates so that it uses the output signal of the level sensor to determine which wave phase the surface 14 is currently in. As a function of this phase, the control unit 48 operates the delivery pump 32 so that potential or kinetic energy is delivered in-phase to the subvolume of water oscillating intermediate storage container 22 and the volume of water 12.

Specifically, potential energy is delivered to the water when it is raised by the delivery pump 32 to a level inside the storage container 22 which is higher than the surface 14, and kinetic energy is delivered to the water when it flows back from the upper region of the storage container 22 into the interior of the aquarium 10, in which case the delivery pump 32 may also be run in the opposite sense in which the rotor 38 increases the flow rate of the water.

For lower energy input, however, the water may also be allowed to flow back from the storage container 22 merely under the effect of gravity. The delivery pump 32 designed as a propeller pump presents only a small resistance to such a return flow.

Such a propeller delivery pump 32 for use in a seawater aquarium with a volume of about 400 to 2000 litres may typically have a delivery power of between 2000 and 10000 litres per hour, with a delivery height corresponding to a water column of 20 to 30 cm.

Figure 2:
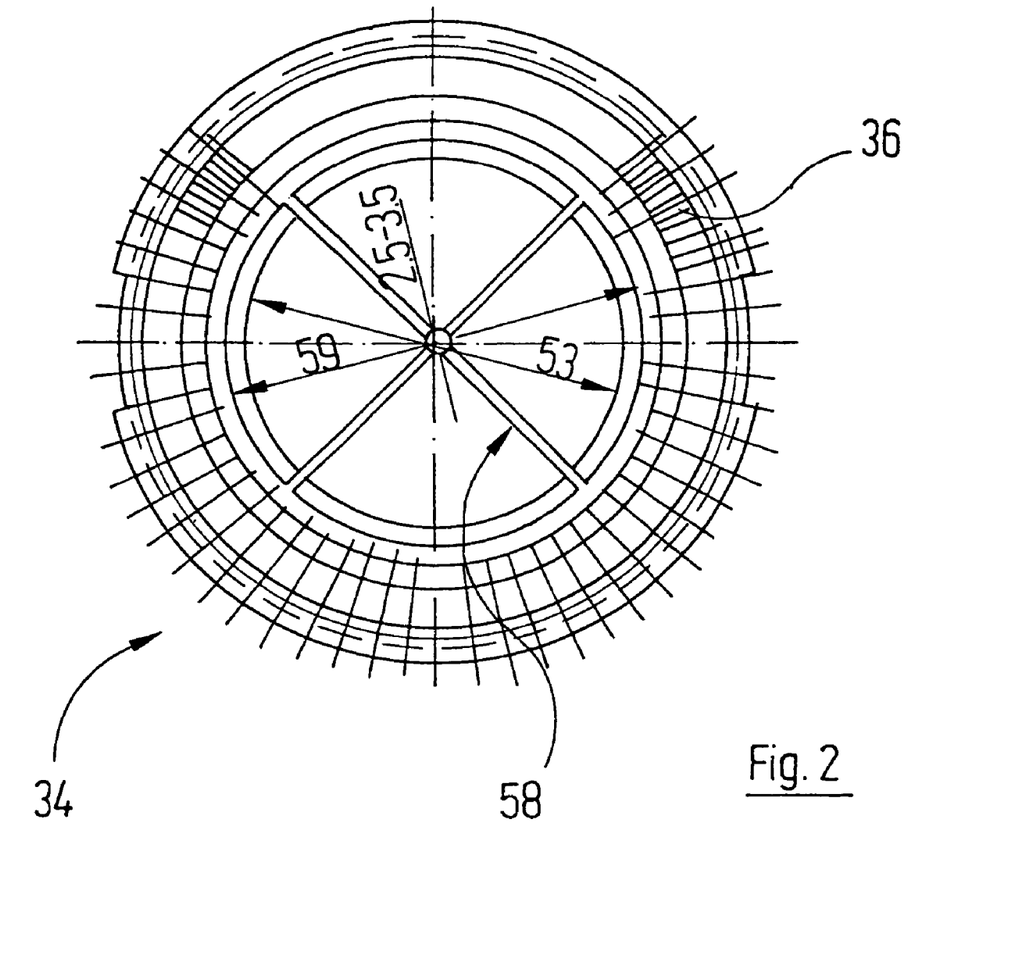
FIG. 2 shows an axial view of a pump housing of a delivery pump, which is part of the wave generator shown in FIG. 1.

If the water is intended to be further accelerated as it flows back, by operating the delivery pump 32 in reverse, then a stabilizing cross 58 as shown in FIG. 2 is preferably also provided in the delivery piece 30 of the delivery pump 32. In this exemplary embodiment, it comprises four thin plates lying in radial planes.

Figure 3:
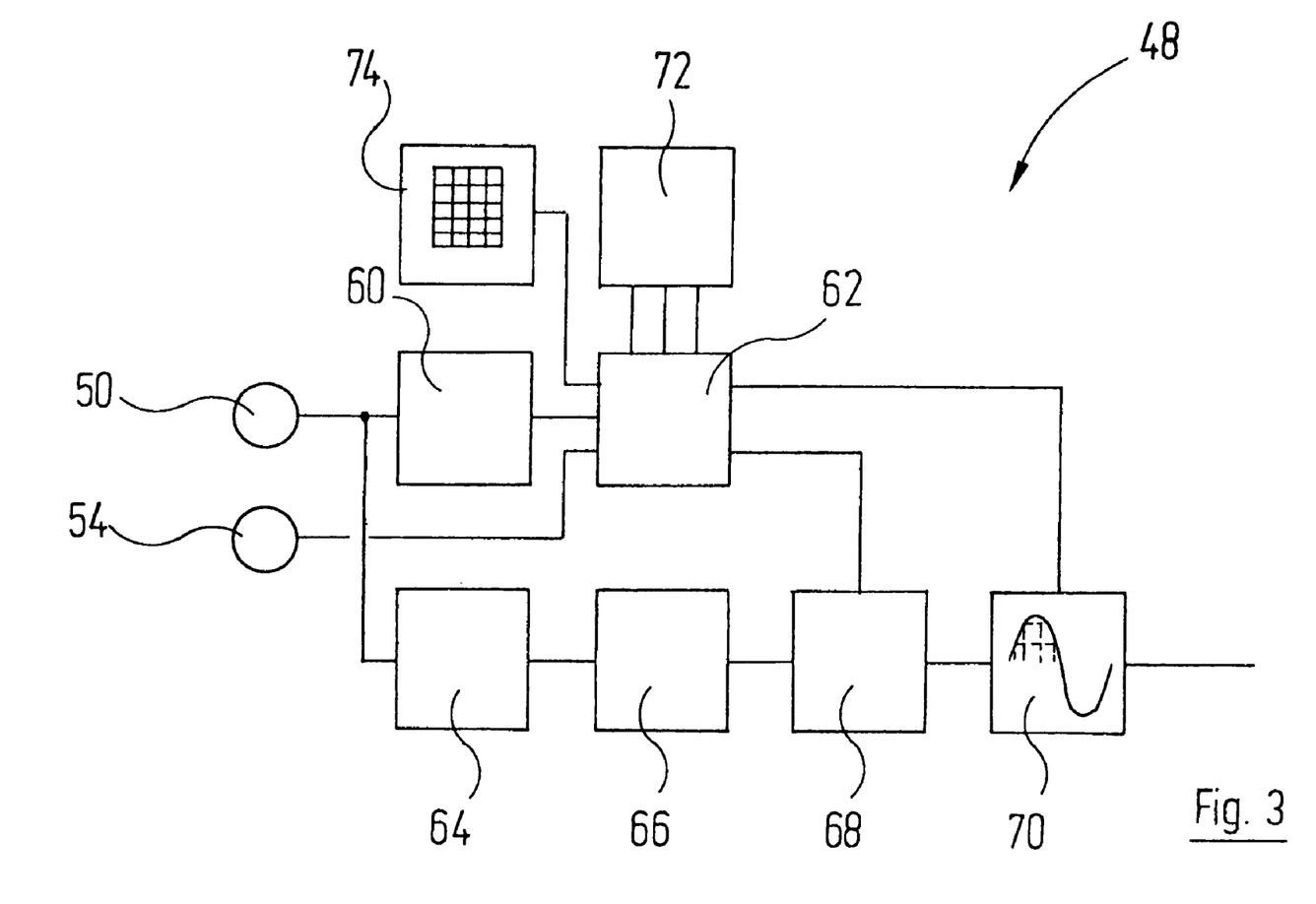
FIG. 3 shows a block diagram of a controller for the wave generator shown in FIG. 1.

FIG. 3 shows a block diagram of the control unit 48.

The output of the level sensor 50 is connected to the input of an amplitude measuring loop 60. The latter contains an A/D converter and a memory, which is switched forward at a predetermined time interval and is dimensioned overall so that it can display one to three full periods of the surface movement. The amplitude of the surface movement is determined from this and sent as a digital signal to a control computer 62.

The output of the level sensor 50 is furthermore connected to a phase and frequency measuring loop 64. This is constructed similarly as the amplitude measuring loop 60, in relation to digitising and storing measurement values, but the stored measurement data are with a view to the period and the phase relation of the output signal of the level sensor 50. The corresponding results are likewise sent to an input of the control computer 62.

This is also used to drive a voltage-controlled oscillator 66. The output signal of the latter is sent to a controllable phase shifter 68. The control terminal thereof is connected to an output of the control computer 70.

The output signal of the phase shifter 68 is sent to a pulse encoder 70 which, generally speaking, operates so that it cuts a portion of adjustable width from the half-wave of the output signal of the phase shifter 68. This may, for example, be done by using a controllable amplitude discriminator. The pulse-width control terminal of the pulse encoder 70 is connected to another output of the control computer 62.

The control computer 62 furthermore interacts with a data memory 72 in which successive data triplets of amplitude, frequency and pulse width are stored.

By using these stored data and the reported actual values of amplitude and frequency, the control computer 62 then maximize the amplitude of the surface movement of the volume of water. This is done firstly by varying the phrase relation (control signal for the phase shifter 68) and then by varying the activation time of the delivery pump 32 (control signal for the pulse encoder 70).

Another input of the control computer 72 is connected to an input unit 74, which is shown as a keypad.

When a setpoint value entered here for the amplitude of the wave in the aquarium 10 is reached then the maximization of the wave amplitude is ended, that is to say operation is thereafter continued with the equivalents for phase relation and pulse width unless a drop in amplitude necessitates readjustment of the phase relation and pulse width.

A last input of the control computer 62 is furthermore connected to the output signal of the level switch 54. When this responds, then the trailing edge of a pulse generated by the pulse encoder 70 is always generated, which avoids overfilling the storage container 22.

Figure 4:
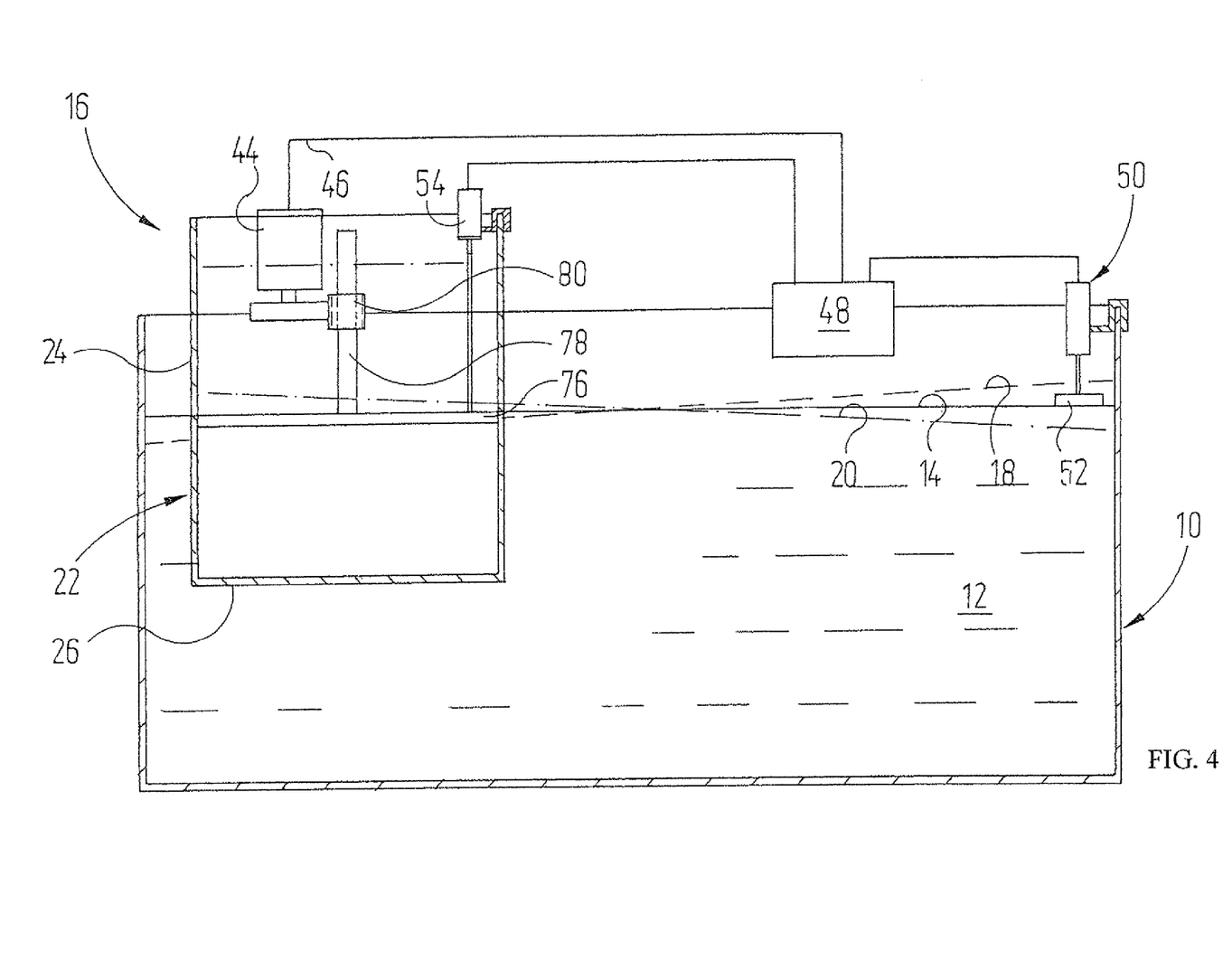
FIG. 4 shows a similar representation to FIG. 1, but in which a modified wave generator is shown.

In the modified exemplary embodiment according to FIG. 4, components which have been already explained above with reference to FIGS. 1 to 3 are still provided with the same reference numbers. These components will not again be described in detail below.

A displacing plate 76, whose edge can be moved essentially fluid-tightly in the manner of a piston inside the storage container 22, is arranged inside the storage container 22 instead of the delivery pump 32. For the purpose of the present application, it may be assumed that the storage container 22 has a somewhat unrounded, for example elliptical cross section so that the displacing plate 76 is guided securely against rotation by the storage container 22.

The displacing plate 76 is carried by a threaded spindle 78, which interacts with a nut 80. The latter is held by an axial bearing (not shown) and is likewise driven by an electric motor 44 whose direction of rotation is reversible. The electric motor 44 is driven similarly as described above with reference to FIG. 3.

In the wave generator shown in FIG. 4, kinetic energy is thus delivered to the volume of water in the aquarium 10 essentially by the downward movement of the displacing plate 76.

If no very great efforts are made with a view to the sealing between the edge of the displacing plate 76 and the inner surface of the storage container 22, the displacing plate can be raised again with air flowing into the space between the displacing plate and the water surface. The water then flows back under gravity through the window 28.

If there is a good seal between the displacing plate 76 and the storage container 22, then water will be sucked from the aquarium into the storage container 22 during the upward movement of the displacing plate 76 so that kinetic energy is likewise delivered to the volume of water during the upward movement of the displacing plate 76.

The movement of the displacing plate 76 is matched by the control unit 48 to the surging of the water in the aquarium 10, similarly as described in the first exemplary embodiment in connection with the operation of the delivery pump 32.

Figure 5:
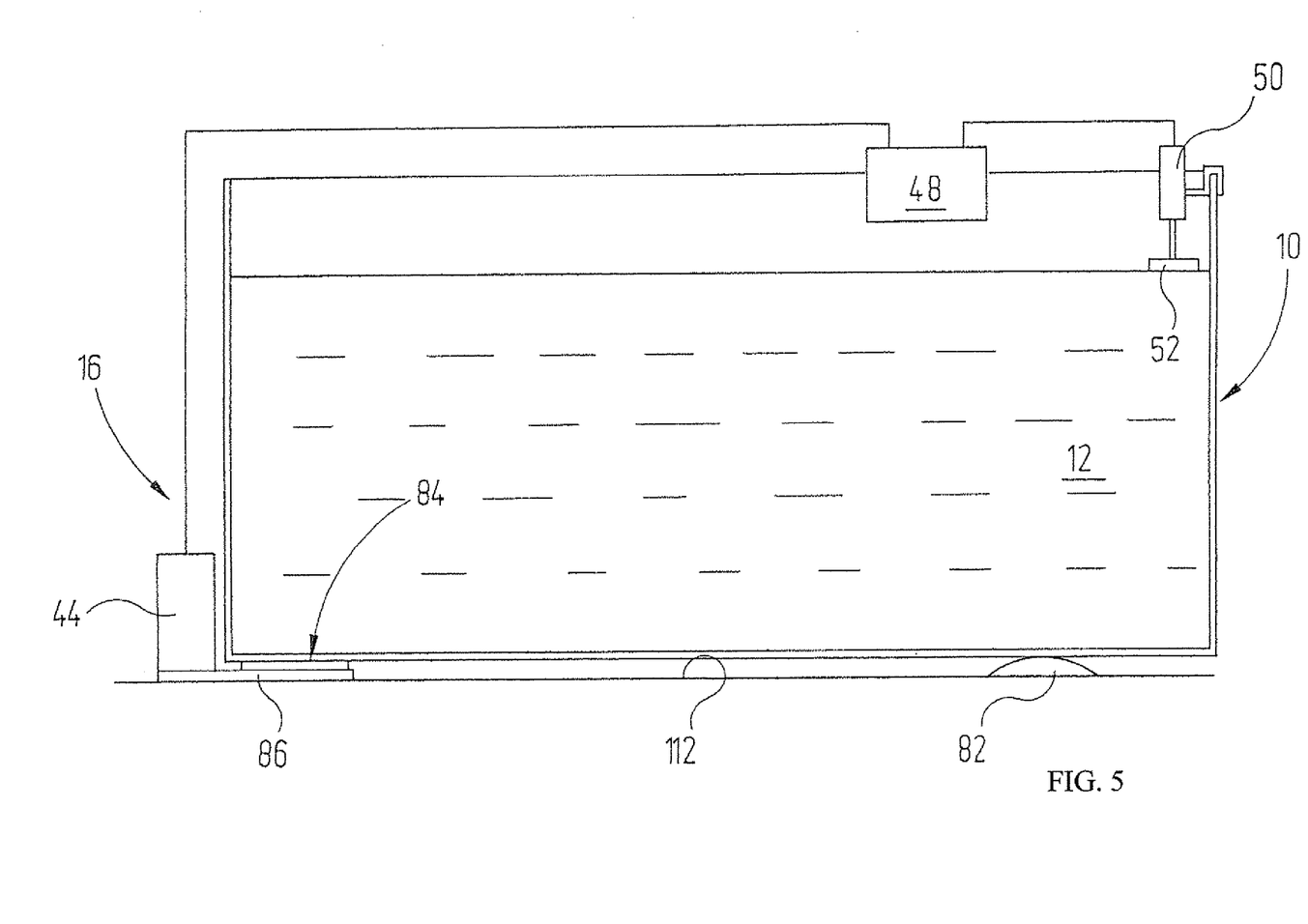
FIG. 5 shows a similar view to FIG. 1, but showing a wave generator arranged outside the aquarium.

In the exemplary embodiment according to FIG. 5 as well, components which have already been described above are provided with the same reference numbers. These components need not again be described in detail below.

In the exemplary embodiment according to FIG. 5, the wave generator 16 is arranged outside the aquarium.

The aquarium 10 is arranged with its right-hand section in FIG. 5 on a bearing rib 82, which is designed as a rail having a sector-shaped cross section. This may extend over essentially the entire depth of the aquarium 10, and a central rail section may be milled.

A base 84, the length of which can be controlled, is provided in the end of the aquarium 10 placed on the left in FIG. 5.

Figure 6:
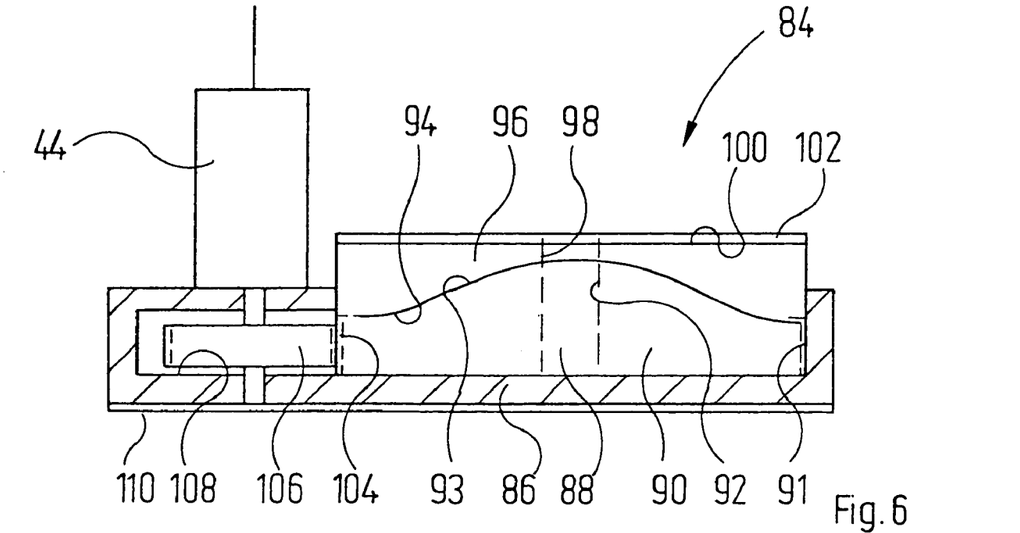
FIG. 6 shows a vertical section through a small-range linear drive, which may be used in the wave generator according to FIG. 5.

As shown by FIGS. 5 and 6, the base 84 has a fixed lower base plate 86, which carries a central bearing pin 88.

A lower cam disc 90, which has a central bore 92 fitting the bearing pin 88, is mounted so that that it can rotate on the latter. A lower end face of the cam disc 90 is flat and cooperates with the end wall of a bearing chamber 91 which is formed in the base plate 86. An upper end face of the cam disc 90 is provided with a cam surface 93 which, for example, may have a sinusoidal profile.

A complementary underlying cam surface 94 of an upper cam disc 96 cooperates with the cam surface 93 of the lower cam disc 90. It also has a central bore 98 which fits the bearing pin 88. An upper end face 100 of the cam disc 96 is flat.

The end face 100 carries an elastic support 102 which fulfils two functions: on the one hand, it fixes the upper cam disc 96 securely against rotation on the lower side of the aquarium 10 and, on the other hand, it allows the lower side of the aquarium 10 to tilt on the base 84.

The lower cam disc 90 is provided on its circumference with ring gear 104 which engages with a pinion 106. The pinion 106 is mounted in a pinion chamber 108 of the base plate 86 and is connected to the shaft of the electric motor 44.

An elastic support 110 provided on the lower side of the base plate 86 provides secure and smooth placement of the base 94 on a support surface 112.

Figure 7:
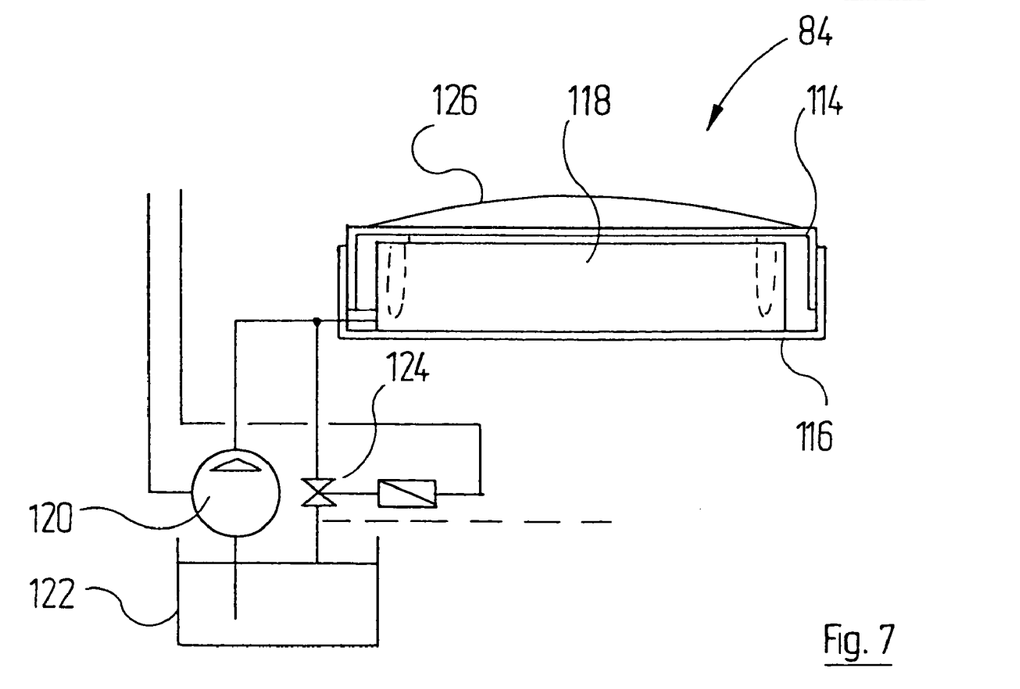
FIG. 7 shows a vertical section through a modified small-range linear actuator, which may also be used in the wave generator according to FIG. 5.

FIG. 7 shows an alternative of a base 84 with a controllable height. It comprises two cooperating telescopic parts 114, 116, each of which is in the form of a shallow cylindrical bowl. A diaphragm motor 118 made of elastomeric material is fitted inside the space delimited by the telescopic parts 114, 116.

The diaphragm motor 118 is connected to the output of a pressure pump 120, which takes in from a storage container 122. The pressure pump 120 is controlled similarly to the operation of the electric motor 44 in the exemplary embodiment according to FIG. 6.

The interior of the diaphragm motor 118 can furthermore be connected to the storage container 122 by means of a solenoid valve 124. The solenoid valve 124 is also controlled by the control unit 48 (generally speaking by the negative half-wave of the output signal of the phase shifter 68).

The pressurization and pressure release of the diaphragm motor 118 are controlled so that energy is delivered to the water in the aquarium in a correct phase relation with the surging of the water in the aquarium.

The exemplary embodiment according to FIG. 7 also differs from the one in FIG. 6 in that the upper end face of the base 84 (the upper-lying bottom of the upper telescopic part 114) is in the shape of a cap, as shown at 126. The support 102 may therefore be obviated.

Figure 8:
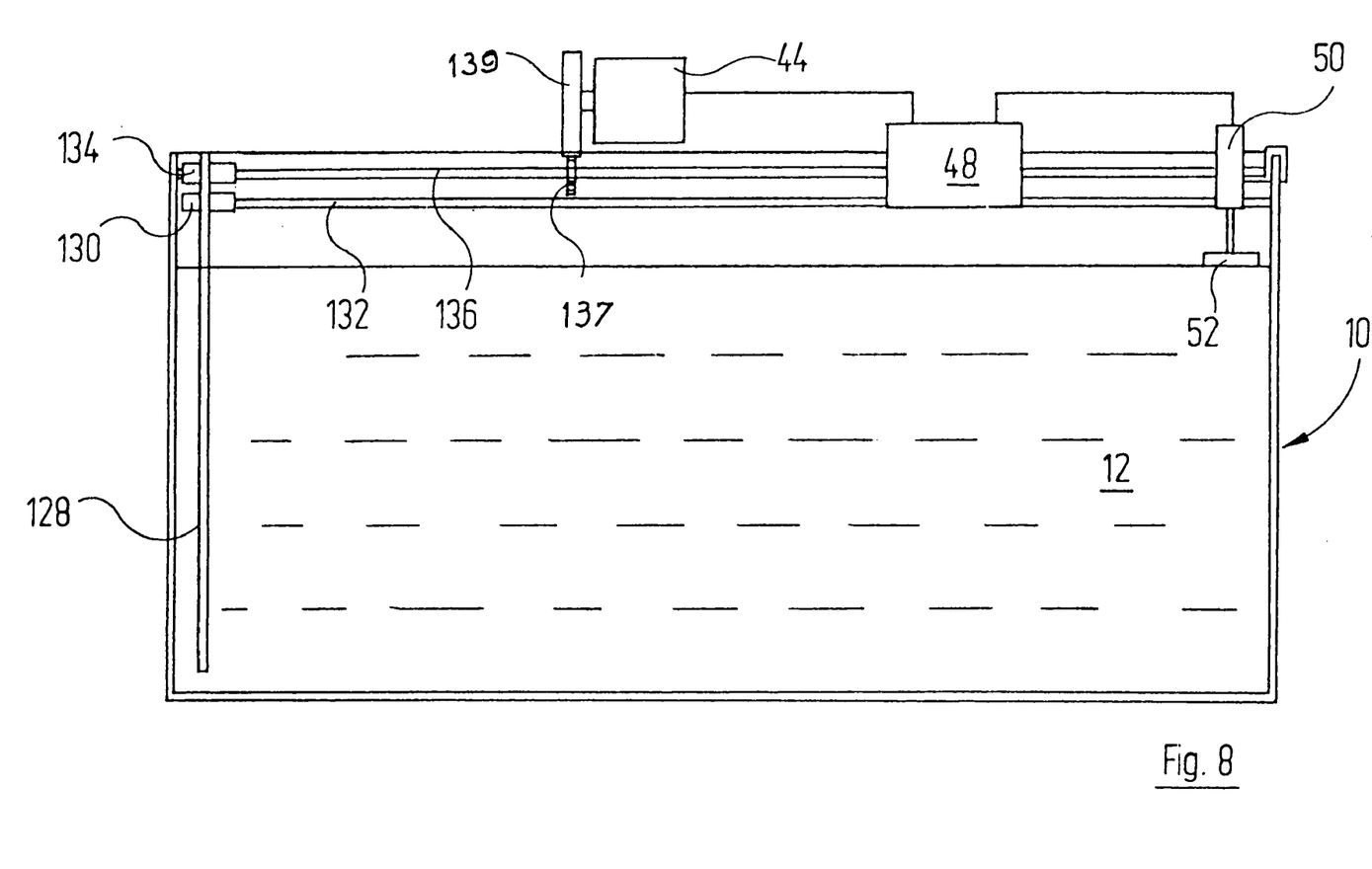
FIG. 8 shows a similar view to FIG. 1, in which a further modified wave generator working inside the aquarium in shown.

In the exemplary embodiment according to FIG. 8 as well, components which have been already described are still provided with the same reference numbers.

Inside the aquarium 10, there is a vertical displacing plate 128 which has a sleeve 130 at the upper end which extends over a guide rod 132 carried by the upper edge of the aquarium.

The displacing plate 128 furthermore carries a nut 134, the axis of which is parallel to the axis of the sleeve 130. The nut 134 interacts with a threaded spindle 136 which is in turn driven via toothed wheels 137, 139 by an electric motor 44, which is likewise fixed to the upper edge of the aquarium 10.

The electric motor 44 is driven similarly to the electric motor working on the horizontal displacing plate 76 in FIG. 4.

Wave-like displacements of the surface 14 of the volume of water 12 are again obtained by movement of the displacing plate 128.

Figure 9:
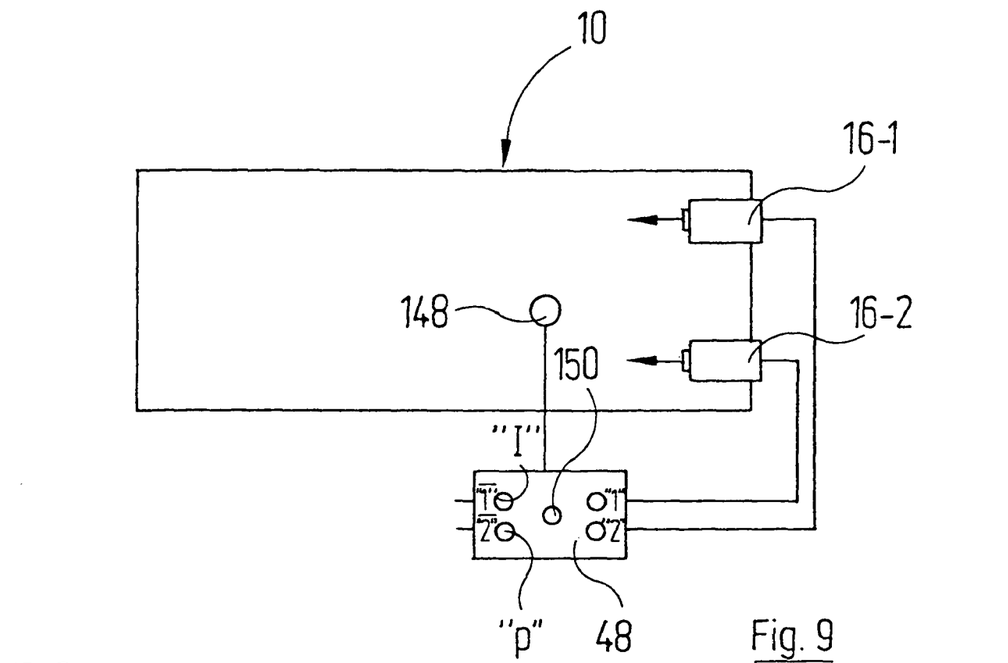
FIG. 9 shows a view of an aquarium which is provided with two wave generators arranged on one of its narrow sides.

In the aquarium 10 shown in FIG. 9, two wave generators 16-1 and 16-2 are placed on the right-hand narrow wall. Their delivery pieces 30 are aligned parallel.

The wave generators 16-1 and 16-2 are connected to supply terminals "1" and "2" of the control unit 48. The latter has a knob "1" on a console for each of the two wave generators 16-1 and 16-2, by which the intensity of the water flow delivered by the wave generator can be adjusted, and a knob "P" by which the phase relation of a packet of water delivered by the wave generator can be adjusted.

The control unit 48 furthermore has other output terminals "−1" and "−2", not required in the exemplary embodiment according to FIG. 9, at which the inverted output signals of the terminals "1" and "2" are provided.

The control unit shown in FIG. 9 operates generally speaking so that it makes the two wave generators 16-1 and 16-2 deliver packets of water and take water back into their storage containers essentially synchronously. The water flows generated by the wave generators 16-1 and 16-2 are therefore added together. Waves with a large amplitude can thus be generated in long aquaria 10 by the arrangement shown in FIG. 9.

The different adjustability of the intensity and phase relation of the water flows delivered by the wave generators 16-1 and 16-2 can be used to compensate for differences in the propagation behaviour for these water flows, which are due to different contouring and different flow resistances of the content of the aquarium (sand piles, plants etc.).

The oscillation frequency of the volume of water contained in them, and the maximum achievable or recommendable wave height will be compiled below for some aquaria.

| 1. | | | | | | |
|---|---|---|---|---|---|---|
| 2. | Dimensions (L × B × H) | | 3. | Frequency | 4. | Max wave height |
| 5. | | | 6. | | 7. | |
| 8. | 70 × 50 × 50 cm | | 9. | 0.45 s | 10. | 40 mm |
| 11. | 100 × 70 × 60 cm | | 12. | 0.56 s | 13. | 35 mm |
| 14. | 120 × 70 × 60 cm | | 15. | 0.63 s | 16. | 35 mm |
| 17. | 150 × 100 × 60 cm | | 18. | 0.83 s | 19. | 30 mm |
| 20. | 180 × 100 × 60 cm | | 21. | 0.86 s | 22. | 30 mm |
| 23. | 220 × 80 × 50 cm | | 24. | 1.10 s | 25. | 25 mm |
| 26. | 200 × 80 × 65 cm | | 27. | 1.15 s | 28. | 25 mm |

Wave formation by superposition is particularly preferable for aquaria with a length of more than two metres. Besides the aforementioned fundamental oscillation, the half-period is also used. One generator is thus operated with a frequency which is about 1.1 s for a 2 m aquarium, and a second wave generator is operated with a frequency of about 0.55 s, i.e. twice the frequency.

The superposition of waves with a different wavelength also makes it possible to influence the waveform. It is thus possible to generate particularly strong waves, raise waves with steep fronts or even generate waves which are distributed in the form of fine ripples over the surface.

In order to switch off the wave generation during the night, the control unit 48 may interact with a sensor 148 responsive to ambient light or the aquarium illumination. When this establishes that the illumination has fallen below a predetermined level, it makes the control unit 48 suppress the output of activation signals to the wave generator/wave generators.

As an alternative, it is also possible for the amplitude of the wave produced at night merely to be reduced on the basis of the output signal of the sensor 148.

When light strikes the sensor 148 again, whether daylight or light from the aquarium illumination, then the wave generator 16 is turned on again.

The control unit 48 furthermore has a button 150 which is pressed when fish in the aquarium need to be fed. The button 150 activates a timer (not shown in detail) in the control unit 48 which suppresses the wave generation for a predetermined length of time, which may be about 10 minutes in practice. In this way, food scattered over the surface of the water remains close to where it was scattered, and is not washed into water plants or decorative objects.

After the length of time specified by the timer has elapsed, the wave generator is automatically turned on again.

If desired, the output terminals "−1" and "−2" providing the inverted signals on the control unit 48 may be omitted, and the inverted signals may be applied if required by using jumpers on the normal output terminals.

Figure 10:
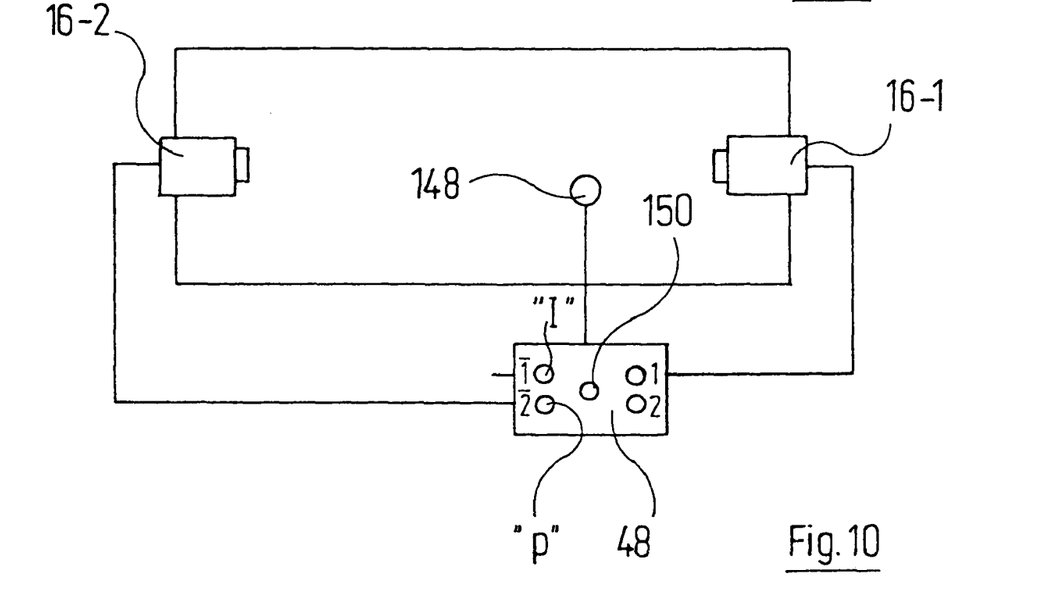
FIG. 10 shows a similar view to FIG. 9, but in which one wave generator is arranged on each of the narrow sides of the aquarium.

An amplified flow of water is obtained in the exemplary embodiment according to FIG. 10. Now however, the two wave generators 16-1 and 16-2 are arranged on the two mutually opposite narrow sides of the aquarium. The two delivery pieces 30 of the wave generators now face towards each other. In order to obtain a flow amplification with this geometry, the wave generator 16-2 is now connected to the output terminal "−2" of the control unit 48.

Figure 11:
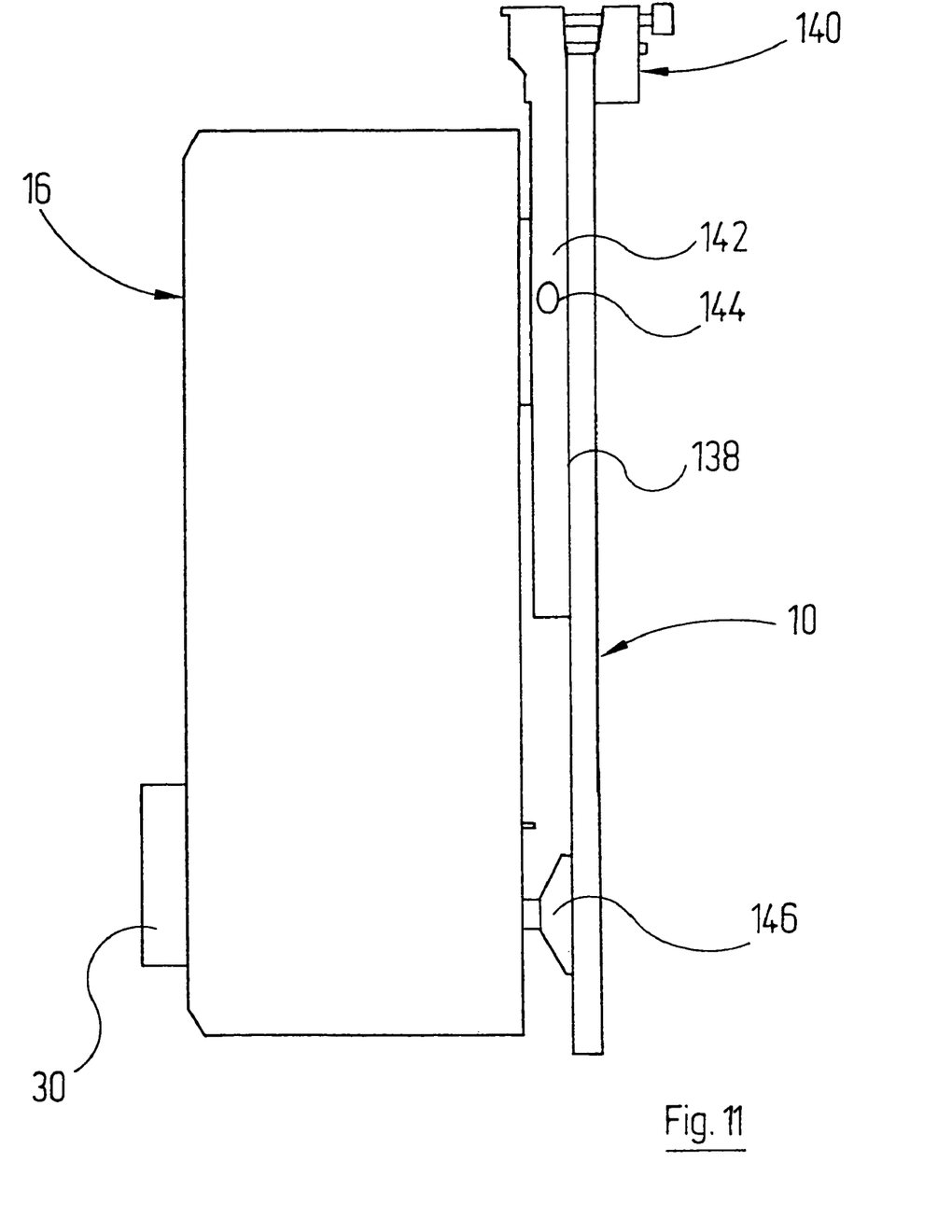
FIG. 11 shows a schematic side view of a wave generator and the way in which it is fastened to an aquarium wall.

FIG. 11 shows the way in which a wave generator 16 is fitted to the wall of an aquarium 10. A guide rail 138 is fastened to the upper end of the aquarium wall using a screw clamp 140. A support slide 142 runs in the guide rail 138. It can be fixed using a clamp screw 144 once it is in the correct position.

of the wave generator 16 is supported on the inside of the aquarium wall by an elastomeric support part 146, which has a similar geometry to a sucker.

The height of the wave generator 16 can in this way be adjusted, and it can be secured to the aquarium while being exactly parallel to the wall of the aquarium.

The immersion depth of the wave generator 16 is adjusted so that, on the one hand, no water reaches the lid of the storage container and, on the other hand, the delivery pump 32 never emerges from the water, which would produce undesirable noise.

The control unit 48 may itself also be secured to the wall of the aquarium 10. This may be done, for example, by using self-adhesive plastic hook strips.

With the wave generators as described above, in aquaria which may typically have a volume of from 200 to 1200 litres, it is possible to generate waves and water movements which are very similar to that encountered in reef biotopes. Since an oscillating movement is imparted to the volume of water in the aquarium, it is possible to set up even high waves with little energy input.

If a wave generator 16 is provided with a large storage container 22, it is also possible to simulate an ebb and flow by keeping water pumped out for longer times. In such a case, the delivery pieces 30 of the delivery pump 32 will preferably be provided with a large-area plate-magnet valve, by which the water pumped from the interior of the aquarium 10 into the storage container 20 can be held there for a longer length of time, even if the delivery pump 32 is then turned off.

The invention claimed is:

1. A device for generating waves in the form of volumes of water moving to and fro periodically in a volume of water which is held in an aquarium, the device comprising:
   a wave generator for delivering of at least one of kinetic and potential energy to a subvolume of an aquarium volume of water, the wave generator further comprising a storage container for the subvolume of water separated from the aquarium at least in one dimension and a delivery instrument having a pump for at least one of intermittently delivering water from the aquarium volume into the storage container and intermittently discharging water from the storage container subvolume into the aquarium volume of water;
   wherein the pump is submersed in the subvolume in the storage container, the pump includes a delivery piece in fluid communication with the aquarium volume, the delivery piece is positioned below a free surface of the aquarium volume and having an axial alignment substantially parallel to the free surface for discharge of a bulk volume of water fluid in a direction substantially parallel to the free surface.

2. Device according to claim 1, wherein the delivery pump has a propeller wheel as a delivery element.

3. Device according to claim 2, wherein the propeller wheel is enclosed by a pump housing, which is provided with through-openings in its circumferential wall and has an axial delivery piece.

4. Device according to claim 3, wherein the delivery piece has water flow stabilization means which are preferably in the form of plates lying in radial planes.

5. Device according to claim 3, wherein the through-openings are designed as axial slots which are distributed in the circumferential direction, and distributed equally in the circumferential direction.

6. Device according to claim 1, wherein the storage container has a circumferential wall of vertical axis and a bottom wall.

7. Device according to claim 6, wherein the delivery instrument is arranged in a lower section of the storage container.

8. Device according to claim 6 wherein a level monitor is arranged at the upper end of the storage container.

9. Device according to claim 1, wherein the delivery instrument operates under the control of a control unit operable to adjust a frequency of the intermittent delivery of water from the subvolume of water in the storage container into the aquarium volume of water.

10. Device according to claim 9, wherein the control unit comprises a clock generator having an adjustable period.

11. Device according to claim 9, wherein the control unit interacts with at least one level detector.

12. Device according to claim 11, wherein at least one of the level detectors can be fitted to the aquarium at a selectable height.

13. Device according to claim 9, further comprising a clock generator of the control unit, with which the delivery can be stopped for a predetermined length of time.

14. Device according to claim 9, further comprising an instrument for stopping the delivery instrument, said instrument having a timeswitch clock or a sensor which responds when the strength of the ambient light falls below a predeterminable value.

15. Device according to claim 1, wherein the storage container can be fitted to the aquarium at an adjustable height.

16. Device according to claim 1 further comprising a filter, an inlet tube and an outlet tube, wherein the inlet tube is arranged at a node of the wave generated in the aquarium and the pump extracts water through the inlet tube for passage through the filter for return through the outlet tube.

17. Device according to claim 1, wherein the device further comprises an adjustable water volume flow control for the delivery instrument.

18. The device of claim 1 wherein the pump is includes a motor and rotary impeller having an axis of rotation substantially parallel to the free surface.

\* \* \* \* \*